(12) United States Patent
Marichetty et al.

(10) Patent No.: US 12,074,784 B2
(45) Date of Patent: Aug. 27, 2024

(54) DYNAMIC CLIENT BALANCING BETWEEN BRANCH GATEWAYS

(71) Applicant: HEWLETT PACKARD ENTERPRISE DEVELOPMENT LP, Houston, TX (US)

(72) Inventors: Venkatesan Marichetty, Santa Clara, CA (US); Amit Pingale, Santa Clara, CA (US); Shabaresha Hemaraju, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 509 days.

(21) Appl. No.: 17/282,924

(22) PCT Filed: Apr. 15, 2019

(86) PCT No.: PCT/US2019/027444
§ 371 (c)(1),
(2) Date: Apr. 5, 2021

(87) PCT Pub. No.: WO2020/214139
PCT Pub. Date: Oct. 22, 2020

(65) Prior Publication Data
US 2021/0392074 A1    Dec. 16, 2021

(51) Int. Cl.
*H04L 45/00* (2022.01)
*H04L 12/46* (2006.01)
*H04L 43/0876* (2022.01)

(52) U.S. Cl.
CPC .......... *H04L 45/22* (2013.01); *H04L 12/4641* (2013.01); *H04L 43/0876* (2013.01); *H04L 45/70* (2013.01)

(58) Field of Classification Search
CPC . H04L 45/22; H04L 12/4641; H04L 43/0876; H04L 45/70; H04L 12/803;
(Continued)

(56) References Cited

U.S. PATENT DOCUMENTS

| 5,983,281 A | 11/1999 | Ogle et al. |
| 9,471,356 B2 | 10/2016 | Ghanwani et al. |

(Continued)

FOREIGN PATENT DOCUMENTS

| KR | 20120016080 A | 2/2012 | |
| WO | WO-2012006170 A2 | 1/2012 | |
| WO | WO-2018007282 A1 * | 1/2018 | ............. H04L 67/14 |

OTHER PUBLICATIONS

Riverbed Technology, Inc., "SteelConnect Manager User Guide," Version 2.7, May 2017, http://support.riverbed.com/bin/support/static/dr5abac55gjf3t2ouklprib2p/html/3g9d2172jnt89410rhhtirpc5h/sc_ug_html/index.html#page/sc_ug/datacenters.html.

(Continued)

*Primary Examiner* — Mohammad S Adhami
*Assistant Examiner* — Jesse P. Samluk
(74) *Attorney, Agent, or Firm* — Hewlett Packard Enterprise Patent Department

(57) ABSTRACT

An example branch gateway (BG) of a local area network (LAN) includes processing circuitry and a memory. The memory includes instructions that cause the BG to determine that a network traffic load of the BG is greater than that of another BG. The instructions further cause the BG to determine that a first network traffic load skew between the BG and the other BG is greater than a first threshold. The instructions further cause the BG to select a first virtual local area network (VLAN) of a set of VLANs of the LAN, wherein network traffic of client devices of the first VLAN is routed through the BG based on a master role of the first VLAN being assigned to the BG. The instructions further cause the BG to transmit a message to the other BG that assigns the master role of the first VLAN to the other BG.

20 Claims, 8 Drawing Sheets

(58) Field of Classification Search
CPC ....... H04L 12/801; H04L 12/66; H04L 12/46; H04L 12/44; H04L 2012/445; H04L 45/586
USPC .......................................................... 370/252
See application file for complete search history.

(56) References Cited

U.S. PATENT DOCUMENTS

| | | |
|---|---|---|
| 9,722,815 B2 | 8/2017 | Mukundan et al. |
| 2005/0025179 A1 | 2/2005 | McLaggan et al. |
| 2013/0301413 A1 | 11/2013 | Moen et al. |
| 2014/0136908 A1* | 5/2014 | Maggiari ............ H04L 41/0663 714/712 |
| 2015/0200839 A1* | 7/2015 | Huang .................... H04L 45/12 370/221 |
| 2016/0036770 A1* | 2/2016 | Chatterjee ............... H04L 67/01 709/203 |
| 2016/0080230 A1 | 3/2016 | Anand et al. |
| 2016/0112902 A1* | 4/2016 | Huh .................. H04W 28/0284 370/235 |
| 2016/0142287 A1 | 5/2016 | Yang et al. |
| 2016/0205196 A1* | 7/2016 | Hasan ................ G05D 23/1934 709/208 |
| 2017/0310641 A1* | 10/2017 | Jiang ..................... H04L 61/103 |
| 2020/0151127 A1* | 5/2020 | Amento ............. G06F 15/17331 |
| 2020/0267051 A1* | 8/2020 | Ranjbar ............... H04L 41/0663 |
| 2020/0287976 A1* | 9/2020 | Theogaraj ............... H04L 67/51 |

OTHER PUBLICATIONS

Tallac Networks, "Tallac SD-LAN Datasheet," Apr. 18, 2018, 17 pages, http://www.tallac.com/wp-content/uploads/2018/04/Tallac-SD-LAN-datasheet-04_18_2018_All.pdf.

Tsai, P-L et al, "Analysis and Evaluation of a Multiple Gateway Traffic-Distribution Scheme for Gateway Clusters," Aug. 11, 2005, https://scholars.lib.ntu.edu.tw/bitstream/123456789/155016/1/24.pdf.

* cited by examiner

DYNAMIC CLIENT BALANCING BETWEEN BRANCH GATEWAYS

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN. These types of topologies are often used by enterprises in establishing their corporate network.

Each network site has its own local area network (LAN) that is connected to the other LANs of the other sites to from the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and head-end gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and head-end gateways) controls certain aspects of routing for their respective LAN, but a network orchestrator controls the overall switching and routing across the WAN.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
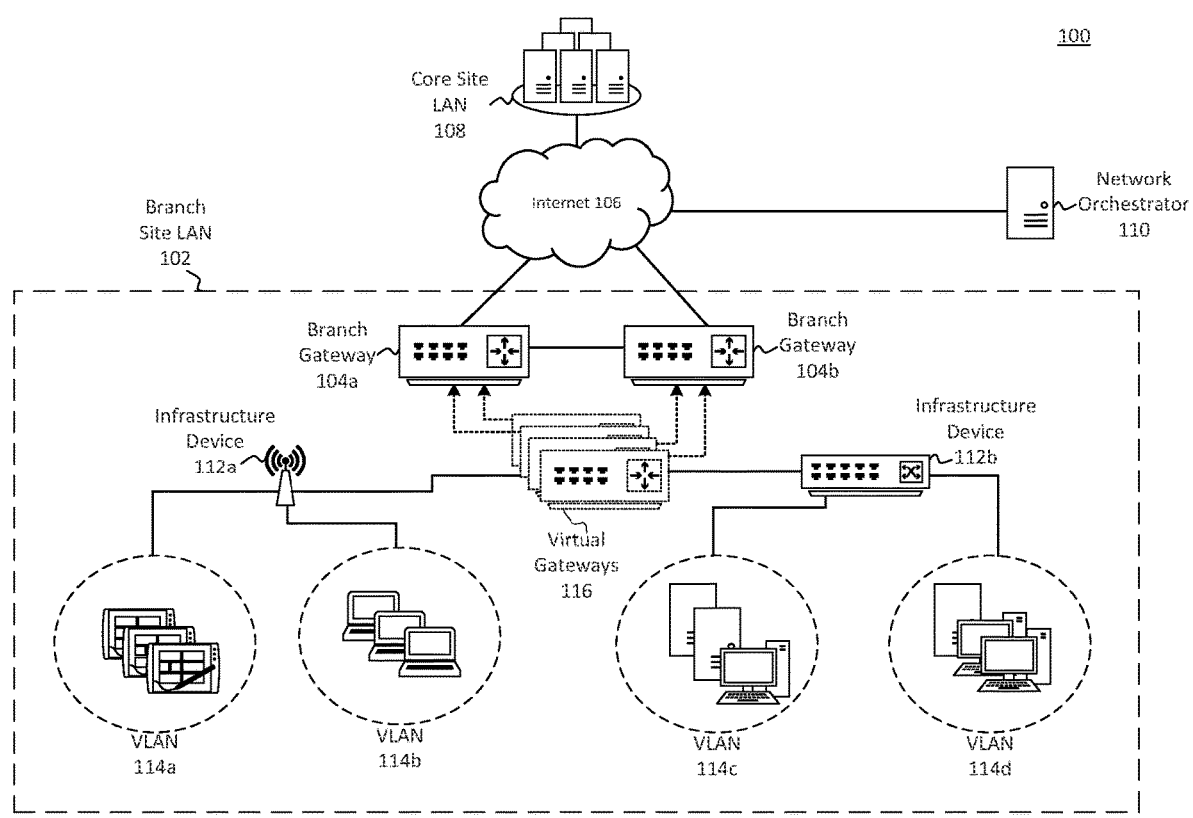
FIG. 1 illustrates an example SD-WAN including a branch site LAN coupled to a core site LAN.

certain examples have features that are in addition to or in lieu of the features illustrated in the above-referenced figures. Certain labels may be omitted from certain figures for the sake of clarity.

DETAILED DESCRIPTION

In a software-defined wide area network (SD-WAN), gateways between site local area networks (LANs) and the broader SD-WAN may be single points of failure for portions of the SD-WAN. For example, a single branch gateway (BG) for a large branch site LAN may disrupt SD-WAN access for many client devices (e.g. laptops, cell phones, servers, IoT devices) of the branch site LAN, and access by client devices across the SD-WAN to services provided from the branch site LAN. To combat a single point of failure, multiple redundant gateways may be deployed in a high availability (HA) configuration to preserve network functionality when a gateway fails.

When BGs are deployed in a HA configuration, they are commonly deployed in an "Active-Standby" configuration where one of the BGs ("Active") routes data traffic between its branch site LAN and other site LANs of the SD-WAN, and another of the BGs ("Standby") is idle as long as the Active BG is functioning properly.

In some other HA deployments, BGs are deployed in an "Active-Active" configuration where each of the BGs routes some portion of data traffic between the branch site LAN and other site LANs of the SD-WAN. Certain client devices may be assigned to a first BG of the branch site LAN and other client devices may be assigned to a second BG of the branch site LAN. In many such deployments, default gateway parameters of each client devices' network configuration may be configured to the respective assigned BG.

In some such deployments, client devices are organized into virtual local area networks (VLANs), and each VLAN is assigned to a respective BG. For example, a branch site LAN with VLANs 1-10 may assign even numbered VLANs (2,4,6,8,10) to a first BG of the branch site LAN, and assign odd numbered VLANs (1,3,5,7,9) to a second BG of the branch site LAN. Often, these VLAN assignments required large amounts of manual configuration by a network administrator to ensure that data traffic from client devices in a certain VLAN was routed through the branch site LAN to the correct BG.

However, some HA deployments may use virtual router redundancy protocol (VRRP) to reduce the amount of configuration required across multiple devices on the branch site LAN. VRRP, in essence, creates a virtual router (in this case, a virtual branch gateway) with an IP address that client devices use as the default gateway in their network configurations. Then, based on the configurations of the BGs, packets sent to the virtual router are routed through a master BG (which, in "Active-Standby" configurations, is the active BG). In order to establish virtual routing in an "Active-Active" configuration, multiple virtual routers (aka "VRRP instances") may be created on a per-VLAN basis, and a master BG is assigned for each VLAN. Similar to how it is mentioned above, VLANs may be assigned to BGs in a round-robin format (even numbered VLANs to a first BG, odd numbered VLANs to a second BG), or using any methodology appropriate to the context.

Even though this rudimentary assignment of VLANs to BGs can roughly balance network traffic load across the BGs of the branch site LAN, there is no guarantee that each VLAN will include the same number of client devices, nor that each client device will have similar network usage requirements and patterns. For example, VLAN 2 may include multiple edge compute devices that transceive large amounts of network traffic, but VLAN 7 may include multiple personal mobile phones that only occasionally transceive more than a trivial amount of network traffic. In a topology where even numbered VLANs are deployed to a first BG and odd numbered VLANs are deployed to a second BG, the first BG may be overloaded (due, in part, to devices on VLAN 2) and the second BG may have spare capacity (due, in part, to devices on VLAN 7).

In this disclosure, such imbalances are detected, and VRRP instances for certain VLANs are reconfigured so that traffic for those certain VLANs are routed through another BG. Extending the previous example, VRRP instances for VLANs 4 and 6 may be reconfigured so that the master BG for those VRRP instances is the second BG. Then, network traffic load may be more evenly balance between the master BG and the second BG. In some situations, the load imbalance between the BGs may be due to a temporary phenomenon (e.g. a group of client devices on a certain VLAN each temporarily engaging in certain network traffic heavy activities). In such situations, the assignments of VLANs to BGs may be re-adjusted to a baseline configuration after the temporary phenomenon ceases.

Certain network infrastructure devices (e.g. switches, access points) of the branch site LAN may include the capability to adjust assignment of devices to VLANs when notified that they are operating in a HA network. For example, the network infrastructure devices, when notified of the HA topology of the network, may assign each successively added client device a VLAN from a pool of VLANs in a round-robin fashion. This prevents an imbalance of assigned clients between VLANs, which could cause load imbalance issues between the BGs.

Each BG, beyond just routing packets, may include packet services. For example, BGs may execute content classification and deep packet inspection services. While a BG may have the bandwidth required to simply route the network traffic passing through, it may not have the resources available to perform the content classification and deep packet inspection services on the network traffic. Network traffic load for a BG takes into account the load imparted on all resources of the BG, including on the resources that provide packet services.

Although the network infrastructure devices are made aware of the HA topology of the network, individual clients may cause more load on the BG than others. In such situations, even though clients have been allocated in a round-robin (or other appropriate) fashion, certain VLANs may still have an outsized impact on the network traffic load of a certain BG. In such situations, the network infrastructure devices may be given instructions to attempt to alleviate the load imbalance in particularly outsized VLANs. For example, network infrastructure devices may be instructed to temporarily cease adding new clients to a certain VLAN. As another example, network infrastructure devices may be instructed to move certain existing clients from a first VLAN to a second VLAN.

In some examples, the network traffic load for each BG may be determined on each respective BG. In some other examples, network traffic load information is forwarded to a network orchestrator that calculates network traffic load factors for each BG. In yet other examples, one of the BGs collects network load information from all BGs of the branch site LAN and calculated network traffic load factors for each BG. Once network traffic load factors are calculated for each BG, a network traffic load skew is determined. If the skew is greater than a certain threshold, remediation measures, as discussed in the previous paragraphs, are implemented to reduce the skew and balance the load across the BGs. Depending on the specific network topology, the remediation measures may be determined and executed by the network orchestrator, a master BG, each BG, or any combination thereof. In some examples, the BGs may include network controllers that, while logically separated from the datapath routing components of the respective BGs, may be collocated in the same BG device. In certain such examples, management of the branch site LAN may be reserved for these network controllers. In certain other such examples, management of the branch site LAN may be orchestrated by a network orchestrator of the SD-WAN in conjunction with the network controllers of the BGs.

The features of this disclosure improve the performance of SD-WANs by rerouting network traffic to take advantage of available BG bandwidth. The resulting improved performance may reduce jitter, latency, and other measures of degrading network efficiency, as well as improve quality of service for time sensitive applications, such as voice over IP.

FIG. 1 illustrates an example SD-WAN including a branch site LAN coupled to a core site LAN. SD-WAN 100 is a wide area network designed using software defined networking principles, such as separating routing control decision making from network infrastructure devices doing the actual routing and switching of packets within SD-WAN 100. SD-WAN includes a branch site LAN 102, a core site LAN 108, and a network orchestrator 110. Branch site LAN 102, core site LAN 108, and network orchestrator 110 are communicatively coupled to one another via Internet 106. Branch site LAN 102 includes branch gateways (BGs) 104 (including 104a, 104b), infrastructure devices 112 (including 112a, 112b), VLANs 114 (including 114a, 114b, 114c, 114d), and virtual gateways 116. VLANs 114 each include client devices, such as edge compute servers, user devices (e.g. laptops, desktops, mobile devices), interface devices (e.g. point of sale devices, kiosks), Internet of Things (IOT) devices, etc.

In some examples, each VLAN 114 is assigned to a certain infrastructure device 112 so that only client devices of the infrastructure device 112 are assigned to VLANs 114 of the infrastructure device 112. In some other examples, each VLAN 114 is independent of infrastructure devices 112, and client devices are assigned to a VLAN 114 based on some criterion or combination of criteria. Some example criteria include selection of VLAN for each successive client device by round-robin format, assignment to VLAN by network role (e.g. employee personal device VLAN, point of sale VLAN), assignment to VLAN by expected network bandwidth usage (e.g. large network bandwidth users are separated into different VLANs).

Client devices of branch site LAN 102 can communicate with one another through infrastructure device 112 (including ones not shown but implied in the branch site LAN 102 cloud). Client devices of branch site LAN 102 can also communicate with devices outside of branch site LAN 102. Any data traffic transceived between a client device of branch site LAN 102 and a device outside of branch site LAN 102 passes through a BG 104. SD-WAN 100 includes two BGs 104a and 104b in branch site LAN 102. BGs 104a and 104b may serve multiple purposes, including high availability (HA), such as uninterrupted failover when one of the BGs fails, and load balancing. The BGs may be configured to enable virtual router redundancy protocol (VRRP), which is a protocol for implementing HA across two routers (or branch gateways). VRRP generates a virtual gateway 116 associated with a virtual IP (VIP) address. Client devices set their default gateway in their network settings to point to the VIP, and the packets are forwarded to the appropriate BG 104 depending on the VRRP configuration. A VRRP instance, once configured, establishes one of the BGs 104 as a master. The master routes all traffic sent to the VIP. For example, if a VRRP instance is established between BG 104a and BG 104b assigning the VIP 192.168.100.4 to the instance and assigning BG 104*a* as the master. All client devices configured with their default gateway as 192.168.100.4 have their traffic routed through SD-WAN 100 by BG 104*a*.

In many SD-WANs, redundant BGs configured with a VRRP instance are deployed in an "Active-Standby" mode, where the active BG (e.g. the VRRP master) routes all inbound and outbound traffic for the entire branch site LAN, and the standby BG sits idly until the active BG (or its connectivity to either the wider network or to the branch site LAN) fails. This is sufficient for the HA needs of the SD-WAN, but is inefficiently using the resources of the BGs. A network administrator could disable VRRP and manually configure each client device to point to BG 104*a* or BG 104*b*, but this solution is not scalable to larger deployments and does not adapt to changing network conditions.

In some SD-WANs, redundant BGs can be deployed in an "Active-Active" mode, where each BG 104 routes a portion of inbound and outbound traffic for branch site LAN 102. However, a VRRP instance cannot balance load between its master gateway and its backup gateway. All traffic sent to the VIP of a VRRP instance is sent to the master gateway of the instance. Alternatively, to enable "Active-Active" mode, multiple virtual gateways 116 can be created from multiple simultaneously running VRRP instances, and each VLAN 114 can have a different VIP assigned as default gateway. For example, VLAN 114*a* can point to a first VIP that routes network traffic through BG 104*a*, VLAN 114*b* can point to a second VIP that routes network traffic through BG 104*b*, VLAN 114*c* can point to a third VIP that routes network traffic through BG 104*a*, and VLAN 114*d* can point to a fourth VIP that routes network traffic through BG 104*b*. In some examples, VLANs are created, numbered, and populated sequentially, and even numbered VLANs are assigned to a first BG (BG 104*a*) and odd numbered VLANs are assigned to a second BG (BG 104*a*).

Although these multiple VRRP instances shift a large portion of the overall network traffic load from one BG to another, it is still possible that the load on BG 104*a* is greater than the load on BG 104*b* or vice versa. Not all client devices use network bandwidth in the same way. For example, edge compute devices may use large amounts of bandwidth on a generally constant basis to synchronize data with compute devices in other LANs, such as core site LAN 108. Employee laptops may instead make occasional data transactions with other LANs, but more consistently use bandwidth to access sites and services on Internet 106. Point of sale devices and kiosks, as another example, may mostly use bandwidth in the branch LAN and only occasionally use broader network bandwidth. As such, even though VLANs have been distributed between BG 104*a* and BG 104*b*, network performance may degrade when devices of a certain VLAN use a disproportionate amount of bandwidth.

BGs 104 each monitor the load on their hardware and logical resources due to the network traffic routed by the respective BG 104 and occasionally transmit network traffic load information to network orchestrator 110. In some examples, BGs 104 transmit the raw load information to network orchestrator 110, which calculates network traffic load factors from the load information. In some other examples, BGs 104 calculate network traffic load factors based on the network traffic load information and transmit the network traffic load factors to network orchestrator 110. Network orchestrator 110 then compares the network traffic load factors for each BG 104 to a network traffic load threshold (either a universal threshold or a custom tailored threshold for each BG 104). If, for example, the network traffic load factor for BG 104*a* is greater than the network traffic load threshold, then network orchestrator 110 may begin remediation of the overload of BG 104*a*. Next, network orchestrator 110 may calculate a network traffic load skew between BG 104*a* and BG 104*b*. The network traffic load skew represents the relative loading of each BG 104. For example, if all VLANs are assigned to BG 104*a* and BG 104*b* is idle (Active-Standby configuration), the network traffic load skew between BG 104*a* and BG 104*b* will be quite large. On the other hand, if VLANs are distributed evenly between BGs 104*a* and 104*b*, and client devices on each VLAN have roughly the same usage as client devices of the other VLANS, the network traffic load skew will be small. Network orchestrator 110 may compare the network traffic load skew between BG 104*a* and BG 104*b* to a skew threshold. If the skew is above the threshold, then network orchestrator 110 will proceed to remediate the overload of BG 104*a*.

In some examples, network orchestrator 110 may determine the network traffic load factor based on the respective numbers of devices in each VLAN. For example, BG 104*a* may be considered overloaded when the number of devices in the VLANs assigned to BG 104*a* are greater than a threshold.

Network orchestrator 110 may have multiple tools at its disposal to remediate the overload of BG 104*a*. Although these tools are described as network orchestrator 110 issuing reconfiguration commands to various network infrastructure devices of SD-WAN 100, in some examples, network orchestrator 110 transmits commands to a network controller (residing on branch gateway 104*a* or 104*b*) of branch site LAN 102, and the network controller issues a separate command to the respective network infrastructure devices.

One such tool reassigns the master BG of a VRRP instance. For example, network orchestrator 110 may determine that the network traffic loads of BG 104*a* and BG 104*b* will be better balanced by moving traffic from VLAN 114*a* from BG 104*a* to BG 104*b*. Network orchestrator 110 will then issue a command to BG 104*a* and BG 104*b* to alter the VRRP instance associated with VLAN 114*a* to change the master BG from BG 104*a* to BG 104*b*. Later, if network orchestrator 110 determines that the network conditions that required VLAN 114*a* to be moved from BG 104*a* to BG 104*b* have ceased, network orchestrator 110 may transmit a command to BG 104*a* and BG 104*b* to alter the VRRP instance associated with VLAN 114*a* to change the master BG from BG 104*b* to BG 104*a*.

Another such tool alters the way that client devices are assigned to VLANs by certain infrastructure devices 112 that support receiving such commands. Certain access points and switches may support receiving messages that indicate that BGs 104 are operating in a HA configuration, and may further support receiving messages that cause the infrastructure device 112 to alter the method for assigning new client devices to VLANs and/or reassign existing client devices to different VLANs. For example, network orchestrator 110 may instruct infrastructure device 112*b* to no longer assign new client devices to VLAN 114*c* because VLAN 114*c* uses a disproportionately large amount of the bandwidth of BG 104*a*. As another example, network orchestrator 110 may instruct infrastructure device 112*a* to move a kiosk device from VLAN 114*a* to VLAN 114*b* because the kiosk device, in combination with other kiosk devices, is using a disproportionately large amount of the bandwidth of BG 104*a*. In yet another example, network orchestrator 110 may notify infrastructure devices 112 that BGs 104*a* and 104*b* are operating in a HA configuration, and infrastructure devices 112 may alter their client assignments to VLANs 114 based on that notification.

Although FIG. 1 (and the other figures of this disclosure) shows a certain network topology with a certain number of LANs, a certain number of BGs, a certain number of network infrastructure devices, a certain number of client devices, and components of SD-WAN 100 in a certain configuration, it would be clear to a person having ordinary skill in the art that SD-WAN 100 could be configured in one of many network topologies, with any number of LANs and devices, and still be consistent with the features of this disclosure. For example, this disclosure contemplates any number of BGs in a LAN, any number of branch site LANs, any number of core site LANs, and the network orchestrator located in any appropriate portion of SD-WAN 100.

Figure 2A:
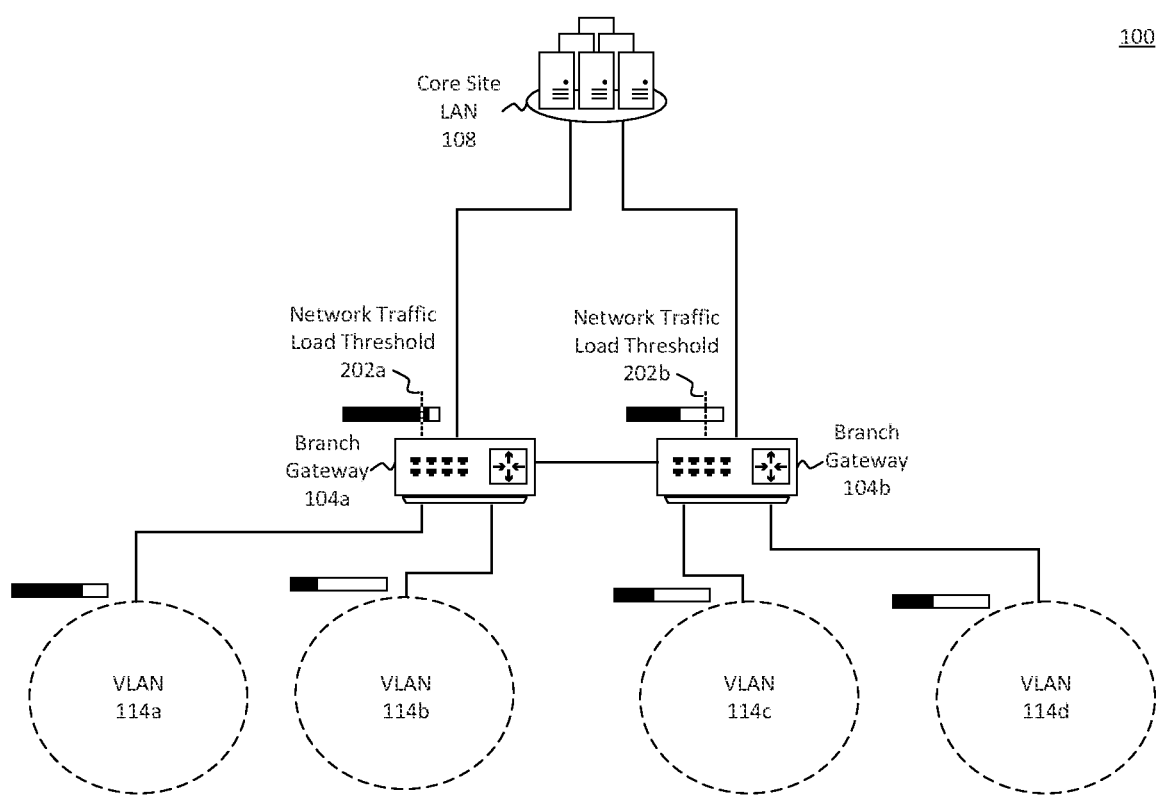
FIGS. 2A-2B are simplified illustrations of the example SD-WAN of FIG. 1, including operation of the branch gateways of the branch site LAN.
Figure 2B:
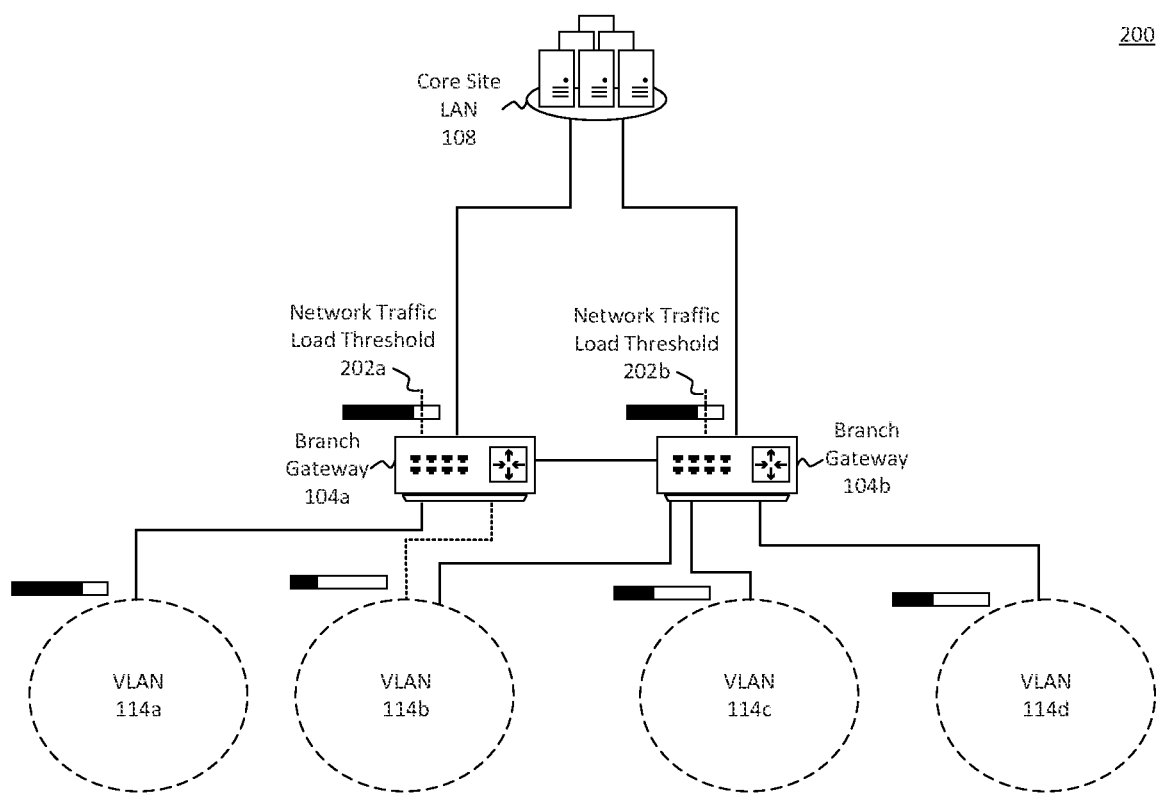

FIGS. 2A-2B are simplified illustrations of the example SD-WAN of FIG. 1, including operation of the branch gateways of the branch site LAN.

FIG. 2A illustrates SD-WAN 100 in a simplified form where VLANs 114 are imbalanced in the amount of network traffic load they generate. VLAN 114a generates an outsized amount of network traffic load compared to the rest of VLANs 114. VLAN 114b generates less network traffic load compared to the rest of VLANs 114. VLANs 114c and 114d generate moderate amounts of network traffic load. As network traffic passes through BGs 104a and 104b, network traffic load is measured. In some examples, each BG 104 uses an algorithm to determine a network traffic load factor from various attributes of network traffic load information collected by the BGs 104. Each BG 104 then compares their respective network traffic load factors to network traffic load thresholds 202. For example, BG 104a has a network traffic load factor that is greater than network traffic load threshold 202a, and BG 104b has a network traffic load factor that is less than network traffic load threshold 202b.

Since BG 104a has a network traffic load factor greater than threshold 202a, BGs 104 may determine a network traffic load skew between BG 104a and BG 104b. The skew is compared to a load skew threshold to determine whether remediation of the overload of BG 104a can be achieved. If, for example, BG 104a were overloaded and BG 104b were only slightly less than overloaded (thus resulting in a low skew), shifting load from one BG to another may only shift the overload from BG 104a to BG 104b. However, if BG 104a is overloaded and BG 104b has significant available bandwidth (thus resulting in a high skew), shifting load from BG 104a to BG 104b may improve network performance. Since the network traffic load skew between BG 104a and BG 104b is high (not shown), SD-WAN 100 remediates the overload of BG 104a.

In FIG. 2B, VLAN 114b has been assigned to BG 104b. In some examples, BGs 104 altered the VRRP instance associated with VLAN 114b so that traffic transceived by devices of VLAN 114b hereafter is routed by BG 104b. Resultantly, the network traffic load factor for BG 104a has become less than network traffic load threshold 202a, and the network traffic load factor for BG 104b has not exceeded network traffic load threshold 202b. Even though VLAN 114a was a larger contributor to the network traffic load of BG 104a, moving VLAN 114a to BG 104b would have caused BG 104b to be overloaded. Instead, all of the VLANs 114 were analyzed and VLAN 114b was chosen to move to BG 104b because the network traffic load contribution of VLAN 114b did not cause BG 104b to become overloaded. In some examples, a network traffic load factor is calculated for each VLAN 114, and a VLAN 114b is selected for reassignment based on projected network traffic load factors for each BG 104 if the selected VLAN 114b were to be reassigned. In some examples, the projected network traffic load factors for each BG 104 are compared to the respective network traffic load thresholds 202.

Figure 3A:
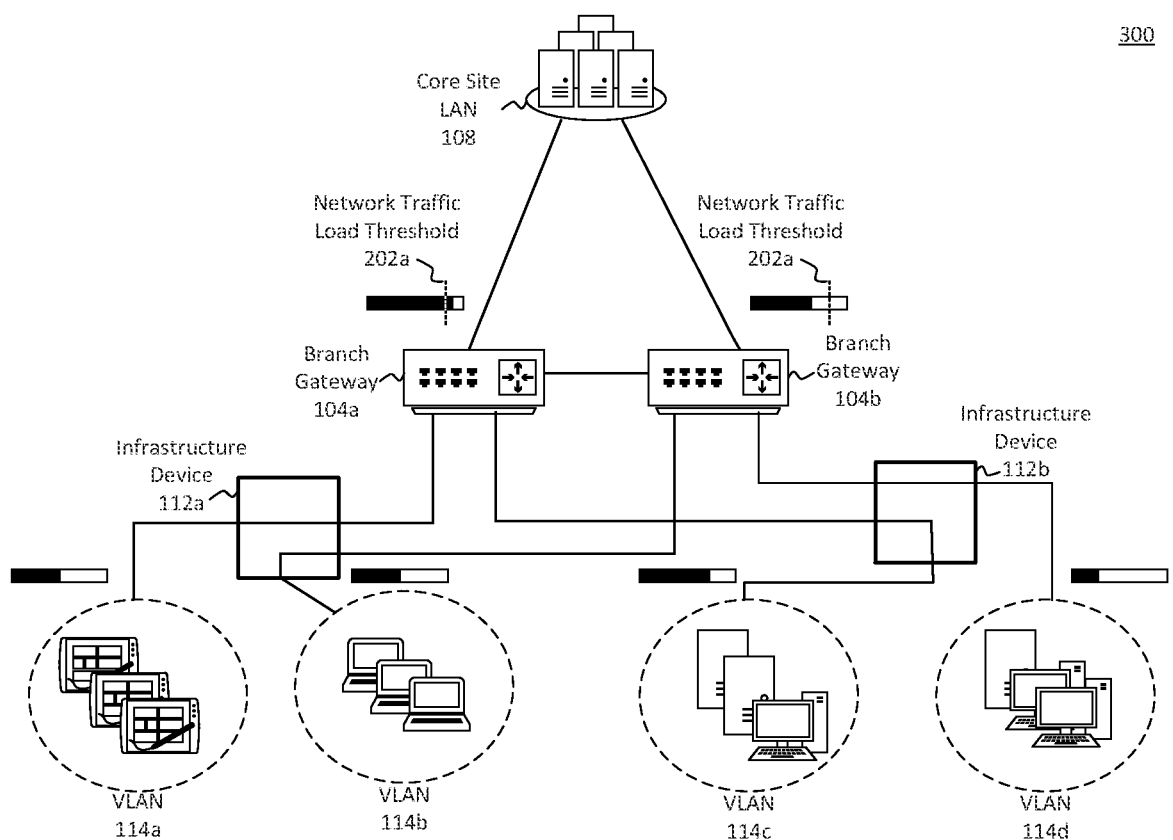
FIGS. 3A-3B are simplified illustrations of the example SD-WAN of FIG. 1, including operation of the branch gateways and infrastructure devices of the branch site LAN.
Figure 3B:
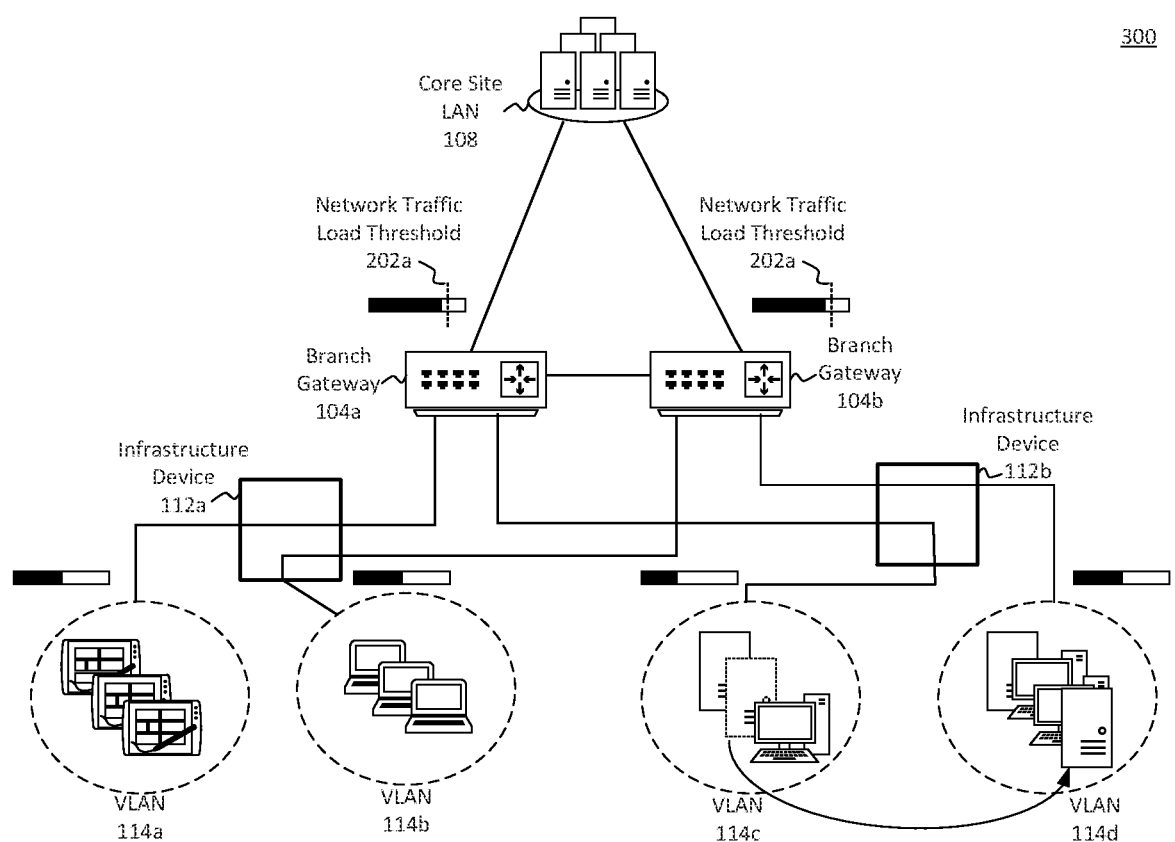

FIGS. 3A-3B are simplified illustrations of the example SD-WAN of FIG. 1, including operation of the branch gateways and infrastructure devices of the branch site LAN.

FIG. 3A illustrates an example SD-WAN including VLANs 114 with client devices assigned. For example, VLAN 114a may include point of sale devices and kiosks, VLAN 114b may include employee laptop computers, and VLANs 114c-114d may include edge compute devices and desktop computers. VLANs 114a and 114c may be assigned to BG 104a, and VLANs 114b and 114d may be assigned to BG 104b. The network traffic load factor for BG 104a is greater than network traffic load threshold 202a, so BG 104a is in an overloaded state. Although BG 104a may not suffer performance degradation due to being in an overloaded state, new devices may be assigned to VLANs that avoid putting extra network traffic load on BG 104a.

FIG. 3B illustrates the assignment of new device communicatively coupled to infrastructure device 112b. New device is restricted from being assigned to VLAN 114c because network traffic for VLAN 114c is routed through BG 104a. Rather, new device is assigned to VLAN 114d and network traffic for new device is routed through BG 104b.

Figure 4:
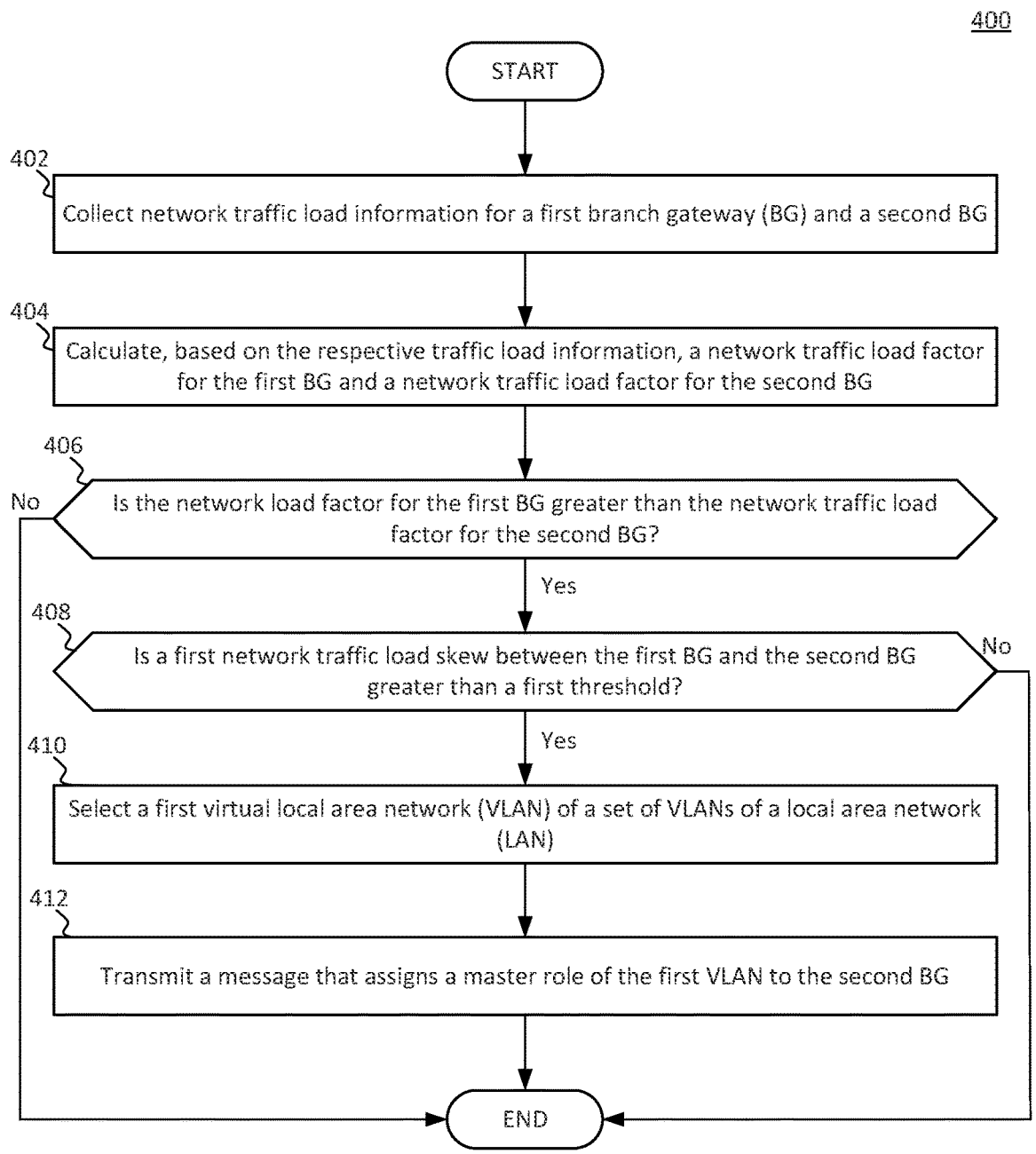
FIG. 4 is a flowchart illustrating an example method for balancing network load across branch gateways of a SD-WAN.

FIG. 4 is a flowchart illustrating an example method 400 for balancing network load across branch gateways of a SD-WAN. In some examples, method 400 is executed by a network orchestrator of a SD-WAN. In some other examples, method 400 is executed by a branch gateway of the SD-WAN.

In block 402, network traffic load information is collected for a first branch gateway and a second branch gateway. In some examples, network traffic load information is a set of device counts for each VLAN assigned to the first gateway and a set of device counts for each VLAN assigned to the second gateway. In some other examples, network traffic load information can include branch gateway usage information, such as packet buffer usage, cpu usage, packet service resource usage, etc.

In block 404, network traffic load factors are calculated for the first branch gateway and the second branch gateway, based on the respective network traffic load information collected in block 402. In some examples, the network traffic load factor is a sum of the set of device counts for each VLAN assigned to the respective gateway. In some other examples, the network traffic load factor is determined using a weighting algorithm to weight various branch gateway usage measurements for each branch gateway.

In block 406, it is determined whether the network load factor of the first BG is greater than the network traffic load factor of the second BG. If yes, then method 400 proceeds to block 408. If no, then method 400 terminates. In some examples, the network load factor of the first BG is also compared to a network load factor threshold, so that the method does not proceed unless the network load of the first BG is not above a certain critical level.

In block 408, it is determined whether a network traffic load skew between the first BG and the second BG is greater than a threshold. In some examples, the network traffic load skew is the difference between the network traffic load factor of the first BG and the network traffic load factor of the second BG. For example, if both the first BG and the second BG are experiencing high network traffic loads, the network traffic load skew may be low even though the determination of block 406 may be "yes".

In block 410 a first virtual local area network (VLAN) is selected from a set of VLANs of a local area network (LAN). The first VLAN may be chosen due to network load characteristics (e.g. user count, latency, jitter, QoS requirements, etc.) The first VLAN may be chosen also due to being assigned to the first BG. In some examples, the first VLAN may be selected because moving the first VLAN from the first BG to the second BG may resolve overutilization of BG resources.

In block 412, a message is transmitted to the first and second BGs (or, alternatively, to an assigned leader BG) that assigns the master role for the first VLAN to the second BG. In some examples, the message is sent from a network orchestrator on a cloud device to the BGs of the LAN. The message may be a VRRP reconfiguration message the causes the VRRP instance for the first VLAN to be reconfigured with different costs such that the second BG becomes master of the VRRP instance.

Figure 5:
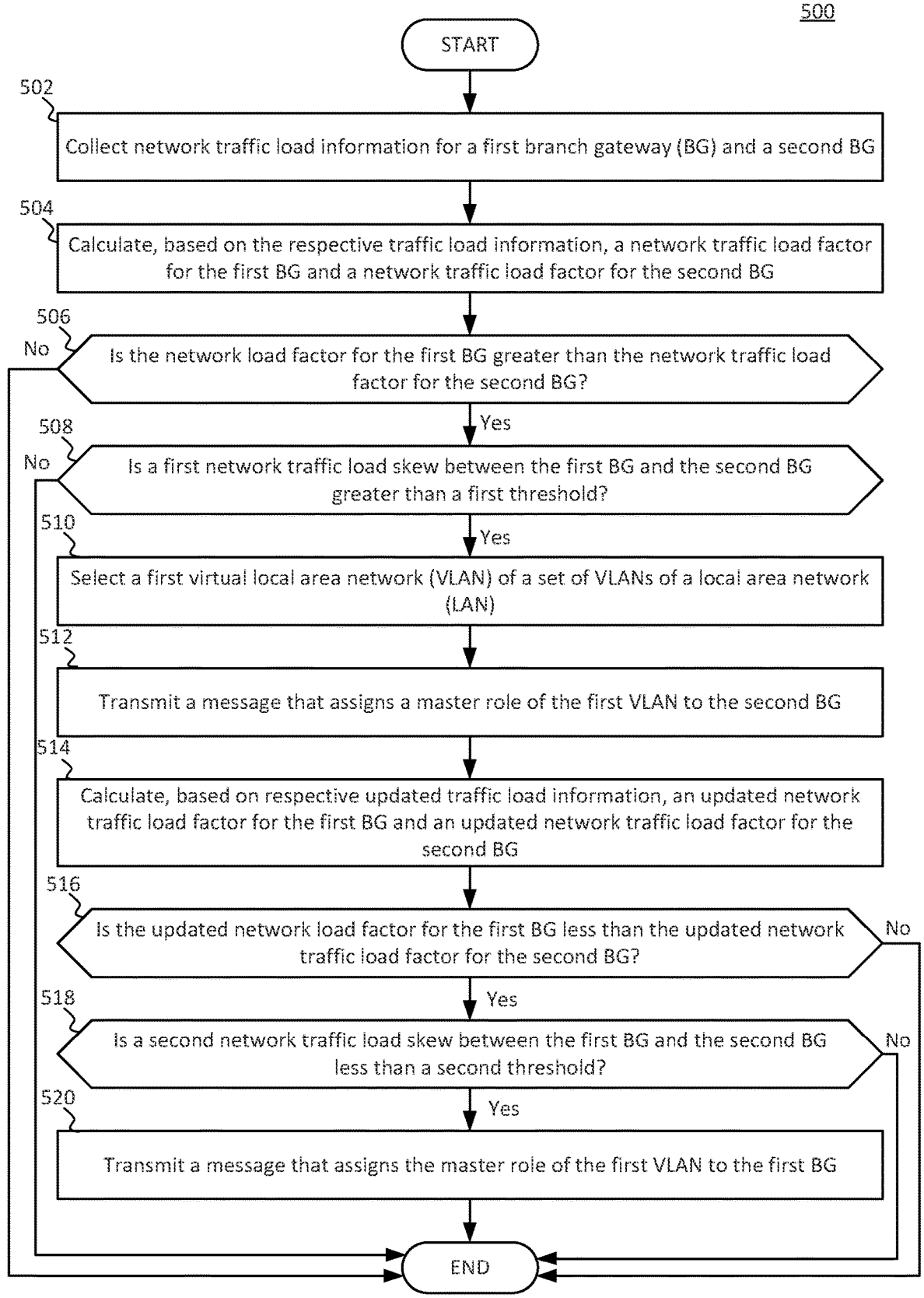
FIG. 5 is a flowchart illustrating another example method for balancing network load across branch gateways of a SD-WAN.

FIG. 5 is a flowchart illustrating another example method for balancing network load across branch gateways of a SD-WAN. In some examples, method 500 is executed by a network orchestrator of a SD-WAN.

In block 502, network traffic load information is collected for a first branch gateway and a second branch gateway. In some examples, network traffic load information is a set of device counts for each VLAN assigned to the first gateway and a set of device counts for each VLAN assigned to the second gateway. In some other examples, network traffic load information can include branch gateway usage information, such as packet buffer usage, cpu usage, packet service resource usage, etc.

In block 504, network traffic load factors are calculated for the first branch gateway and the second branch gateway, based on the respective network traffic load information collected in block 502. In some examples, the network traffic load factor is a sum of the set of device counts for each VLAN assigned to the respective gateway. In some other examples, the network traffic load factor is determined using a weighting algorithm to weight various branch gateway usage measurements for each branch gateway.

In block 506, it is determined whether the network load factor of the first BG is greater than the network traffic load factor of the second BG. If yes, then method 500 proceeds to block 508. If no, then method 500 terminates. In some examples, the network load factor of the first BG is also compared to a network load factor threshold, so that the method does not proceed unless the network load of the first BG is not above a certain critical level.

In block 508, it is determined whether a first network traffic load skew between the first BG and the second BG is greater than a threshold. In some examples, the first network traffic load skew is the difference between the network traffic load factor of the first BG and the network traffic load factor of the second BG. For example, if both the first BG and the second BG are experiencing high network traffic loads, the first network traffic load skew may be low even though the determination of block 506 may be "yes".

In block 510 a first virtual local area network (VLAN) is selected from a set of VLANs of a local area network (LAN). The first VLAN may be chosen due to network load characteristics (e.g. user count, latency, jitter, QoS requirements, etc.) The first VLAN may be chosen also due to being assigned to the first BG. In some examples, the first VLAN may be selected because moving the first VLAN from the first BG to the second BG may resolve overutilization of BG resources.

In block 512, a message is transmitted to the first and second BGs (or, alternatively, to an assigned leader BG) that assigns the master role for the first VLAN to the second BG. In some examples, the message is sent from a network orchestrator on a cloud device to the BGs of the LAN. The message may be a VRRP reconfiguration message the causes the VRRP instance for the first VLAN to be reconfigured with different costs such that the second BG becomes master of the VRRP instance.

In block 514, updated network traffic load factors are calculated for the first branch gateway and the second branch gateway, based on updated network traffic load information. In some examples, the updated network traffic load factor is a sum of the set of device counts for each VLAN assigned to the respective gateway. In some other examples, the updated network traffic load factor is determined using a weighting algorithm to weight various branch gateway usage measurements for each branch gateway.

In block 516, it is determined whether the updated network load factor of the first BG is greater than the updated network traffic load factor of the second BG. If yes, then method 500 proceeds to block 518. If no, then method 500 terminates. In some examples, the updated network load factor of the first BG is also compared to a network load factor threshold, so that the method does not proceed unless the updated network load of the first BG is not above a certain critical level.

In block 518, it is determined whether a second network traffic load skew between the first BG and the second BG is greater than a threshold. In some examples, the second network traffic load skew is the difference between the updated network traffic load factor of the first BG and the updated network traffic load factor of the second BG. For example, if both the first BG and the second BG are experiencing high network traffic loads, the second network traffic load skew may be low even though the determination of block 516 may be "yes".

In block 520, a message is transmitted to the first and second BGs (or, alternatively, to an assigned leader BG) that assigns the master role for the first VLAN to the first BG. In some examples, the message is sent from a network orchestrator on a cloud device to the BGs of the LAN. The message may be a VRRP reconfiguration message the causes the VRRP instance for the first VLAN to be reconfigured with different costs such that the first BG becomes master of the VRRP instance.

Figure 6:
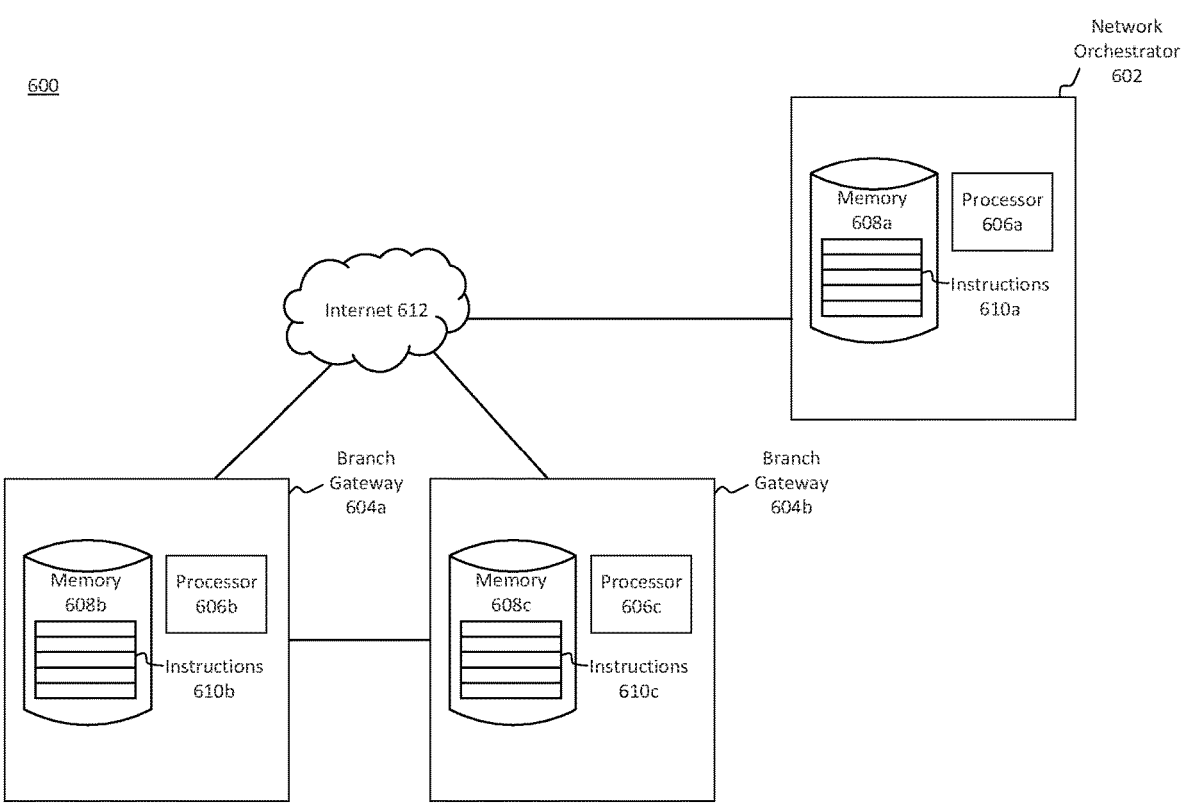
FIG. 6 illustrates an example simplified SD-WAN including a network orchestrator and branch gateways.

FIG. 6 illustrates an example simplified SD-WAN including a network orchestrator and branch gateways. SD-WAN 600 includes a network orchestrator 602 coupled to branch gateways 604*a-b* through Internet 612. Network orchestrator 602 includes processor 606*a* and memory 608*a* including instructions 610*a*. Branch gateway 604*a* includes processor 606*b* and memory 608*b* including instructions 610*b*. Branch gateway 604*b* includes processor 606*c* and memory 608*c* including instructions 610*c*.

Network orchestrator 602 includes instructions 610*a* in memory 608*a* that, when executed by processor 606*a*, cause network orchestrator 602 to undertake certain actions. For example, instructions 610*a* may include instructions to monitor a first set of load parameters for branch gateway 604*a*, including a utilization factor for a deep packet inspection service provided by BG 604*a* and a utilization factor for a content classifier service of BG 604*a*. In some examples, the utilization factors for the services are weighted hardware usage metrics for each service (e.g. CPU usage, network interface card usage).

Instructions 610a may also include instructions to monitor a second set of load parameters for branch gateway 604b, including a utilization factor for a deep packet inspection service provided by BG 604b and a utilization factor for a content classifier service of BG 604b. In some examples, the utilization factors for the services are weighted hardware usage metrics for each service (e.g. CPU usage, network interface card usage).

Instructions 610a may also include instructions to periodically calculate a network traffic load for BG 604a based on the first set of load parameters and a network traffic load for BG 604b based on the second set of load parameters. The network traffic loads for BGs 604a-b may be load factors (i.e. numerical indications of the load on each BG 604).

Instructions 610a may also include instructions to update a network traffic load skew indicating a difference in traffic loads between BG 604a and BG 604b. In some examples, the network traffic load skew is the numerical difference between the traffic loads. The greater the inequality of loading between BG 604a and BG 604b, the larger the network traffic load skew.

Instructions 610a may also include instructions to determine that the network traffic load for BG 604a is greater than an overload threshold. Even though loads may be imbalanced between BG 604a and BG 604b, if neither BG 604 is overloaded, there may not be performance improvement by rebalancing clients across the BGs 604. Therefore, if BG 604a is not overloaded, network orchestrator 602 may not attempt to alleviate the load on BG 604a by transferring some clients to BG 604b.

Instructions 610a may also include instructions to determine that the updated network traffic load skew is greater than a skew threshold. Even though BG 604a may be overloaded, BG 604b may also be overloaded, and there may not be performance improvement by rebalancing clients across the BGs 604. Therefore, if the updated network traffic load skew is less than the skew threshold, network orchestrator 602 may not attempt to alleviate the load on BG 604a by transferring some clients to BG 604b.

Instructions 610a may also include instructions to transmit a message to BGs 604, who may forward the message to a switch, AP or other infrastructure device communicatively couple with a client device of a first VLAN. The first VLAN may be configured to route traffic through BG 604a. The message may instruct the infrastructure device to reassign the client device to a second VLAN. The second VLAN may be configured to route traffic though BG 604b. The message may also or alternatively instruct the infrastructure device to cease assigning new client devices to the first VLAN, thus avoiding exacerbating an imbalance in network traffic load generated by the first VLAN in comparison to the second VLAN (and other VLANs).

Branch gateway 604a includes instructions 610b in memory 608b that, when executed by processor 606b, cause branch gateway 604a to undertake certain actions. Instructions 610b may include instructions to enable VRRP and to establish VRRP instances for each VLAN of the branch LAN. Instructions 610b may also include instructions to gather load parameters, including user count per assigned VLAN, jitter, dropped packets, and latency for data packets routed through BG 604a, hardware device usage (e.g. CPU usage, NIC usage, etc) of BG 604a, and service utilization for packet services (e.g. DPI, content classification, etc.) of BG 604a. Instructions 610b may also include instructions to alter VRRP instances for a certain VLAN based on a message from network orchestrator 602 so that the master of the VRRP instance toggles from BG 604a to BG 604b or from BG 604b to BG 604a.

Branch gateway 604b includes instructions 610c in memory 608c that, when executed by processor 606c, cause branch gateway 604b to undertake certain actions. Instructions 610c may include instructions to enable VRRP and to establish VRRP instances for each VLAN of the branch LAN. Instructions 610c may also include instructions to gather load parameters, including user count per assigned VLAN, jitter, dropped packets, and latency for data packets routed through BG 604b, hardware device usage (e.g. CPU usage, NIC usage, etc) of BG 604b, and service utilization for packet services (e.g. DPI, content classification, etc.) of BG 604b. Instructions 610c may also include instructions to alter VRRP instances for a certain VLAN based on a message from network orchestrator 602 so that the master of the VRRP instance toggles from BG 604a to BG 604b or from BG 604b to BG 604a.

Although FIG. 6 shows devices configured with a single processor 606 and a memory 608, any appropriate computing configuration is anticipated, including multiple processors, alternate data storage paradigms, distributed computing, infrastructure as a service, etc.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A virtual local area network (VLAN) is a logical partition of a portion of a WAN. A VLAN may be contained within a certain LAN of the WAN or it may span across multiple LANs of the WAN. VLANs are implemented in layer 2 of the OSI model (the data link layer) and, among other benefits, improve network configurability as the size of the network scales. VLAN capable infrastructure devices may allocate VLANs on a per-port basis or may tag certain data frames with information associating the frames with their respective VLANs. VLANs may be used to group related devices, balance load on certain network infrastructure devices, apply security and routing policies on a broad basis, implement quality of service (QoS), etc.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A system comprising:
a processor; and
a non-transitory storage medium storing instructions that when executed on the processor cause the system to:
determine that a network traffic load of a first branch gateway (BG) of a local area network (LAN) is different from a network traffic load of a second BG of the LAN;
determine that a first network traffic load skew between the first BG and the second BG is greater than a first threshold;
select a first virtual local area network (VLAN) of a set of VLANs of the LAN, wherein a first virtual router is established for the first VLAN, and a second virtual router is established for a second VLAN of the set of VLANs, wherein network traffic of client devices of the first VLAN sent to the first virtual router is routed through the first BG based on the first BG being a master BG for the first VLAN according to a configuration of the first virtual router; and
transmit, to at least one of the first BG and the second BG, a reconfiguration message that alters the configuration of the first virtual router associated with established for the first VLAN, the altering of the configuration of the first virtual router re-assigning the second BG as the master BG for the first VLAN, wherein after the altering of the configuration of the first virtual router network traffic of the client devices of the first VLAN is routed through the second BG.

2. The system of claim 1, wherein the set of VLANs includes a first subset of VLANs and a second subset of VLANs, and wherein the first BG is assigned a master role for each VLAN of the first subset of VLANs, and the second BG is assigned a master role for each VLAN of the second subset of VLANs.

3. The system of claim 2, wherein the reconfiguration message moves the first VLAN from the first subset of VLANs to the second subset of VLANs.

4. The system of claim 1, wherein the instructions when executed on the processor cause the system to:
determine that an updated network traffic load of the first BG is less than an updated traffic load of the second BG; and
in response to determining that the updated network traffic load of the first BG is less than the updated traffic load of the second BG, transmit, to at least one of the first BG and the second BG, a further reconfiguration message that re-assigns the first BG as the master BG for the first VLAN.

5. The system of claim 1, wherein the network traffic load of the first BG is based on hardware load factors representing usage of hardware in the first BG.

6. A method comprising:
collecting traffic load information for a first branch gateway (BG) and a second BG;
calculating, based on the traffic load information, a network traffic load factor for the first BG and a network traffic load factor for the second BG;
determining that the network traffic load factor for the first BG is greater than the network traffic load factor for the second BG;
determining that a first network traffic load skew between the first BG and the second BG is greater than a first threshold;
selecting a first virtual local area network (VLAN) of a set of VLANs of a local area network (LAN), wherein a first virtual router is established for the first VLAN, and a second virtual router is established for a second VLAN of the set of VLANs, wherein network traffic of client devices of the first VLAN sent to the first virtual router is routed through the first BG based on the first BG being a master BG for the first VLAN according to a configuration of the first virtual router, and wherein the first VLAN is selected based, in part, on a count of the client devices of the first VLAN; and transmitting, to at least one of the first BG and the second BG, a reconfiguration message that alters the configuration of the first virtual router associated with the first VLAN, the altering of the configuration of the first virtual router re-assigning the second BG as the master BG for the first VLAN, wherein after the altering of the configuration of the first virtual router network traffic of the client devices of the first VLAN is routed through the second BG.

7. The method of claim 6, wherein the first BG and the second BG are members of a Virtual Router Redundancy Protocol (VRRP) group, and each respective VLAN of the set of VLANS is associated with a corresponding VRRP instance assigning a master BG to the respective VLAN.

8. The method of claim 6, further comprising:
calculating updated network traffic load factors for the first BG and the second BG based on updated traffic load information;
determining that an updated network traffic load factor for the first BG is less than an updated network traffic load factor for the second BG;
determining that a second network traffic load skew between the first BG and the second BG is less than a second threshold; and
in response to determining that the updated network traffic load factor for the first BG is less than the updated network traffic load factor for the second BG and determining that the second network traffic load skew between the first BG and the second BG is less than the second threshold, transmitting, to at least one of the first BG and the second BG, a further reconfiguration message that re-assigns the first BG as the master BG for the first VLAN.

9. The method of claim 6, further comprising:
calculating updated network traffic load factors for the first BG and the second BG based on respective updated traffic load information;
determining that an updated network traffic load factor for the first BG is still greater than an updated network traffic load factor for the second BG;
determining that a second network traffic load skew between the first BG and the second BG is less than the first threshold; and
in response to determining that the second network traffic load skew between the first BG and the second BG is less than the first threshold, transmitting, to at least one of the first BG and the second BG, a further reconfiguration message that re-assigns the first BG as the master BG for the first VLAN.

10. The method of claim 6, wherein the collecting of the traffic load information comprises collecting a first set of load parameters for the first BG, including a utilization factor for a deep packet inspection service of the first BG and a utilization factor for a content classification service of the first BG, and collecting a second set of load parameters for the second BG, including a utilization factor for a deep packet inspection service of the second BG and a utilization factor for a content classification service of the second BG, and
wherein the calculating of the network traffic load factor for the first BG is based on the first set of load parameters, and the calculating of the network traffic load factor for the second BG is based on the second set of load parameters.

11. A non-transitory computer-readable medium comprising instructions that, when executed by processing circuitry, cause a system to:
monitor a first set of load parameters for a first branch gateway (BG), including a utilization factor for a deep packet inspection service of the first BG and a utilization factor for a content classification service of the first BG;
monitor a second set of load parameters for a second BG, including a utilization factor for a deep packet inspection service of the second BG and a utilization factor for a content classification service of the second BG;
calculate a network traffic load of the first BG based on the first set of load parameters, and calculate a network traffic load of the second BG based on the second set of load parameters;
select a first virtual local area network (VLAN) of a set of VLANs, wherein network traffic of client devices of the first VLAN is routed through the first BG based on the first BG being a master BG for the first VLAN;
determine a network traffic load skew indicating a difference in traffic loads between the first BG and the second BG;
determine that the network traffic load of the first BG is greater than a first threshold;
determine that the network traffic load skew is greater than a second threshold; and
transmit, to at least one of the first BG and the second BG, a reconfiguration message that alters a virtual router associated with the first VLAN, the altering of the virtual router re-assigning the second BG as the master BG for the first VLAN, wherein after the altering of the virtual router network traffic of the client devices of the first VLAN is routed through the second BG.

12. The non-transitory computer-readable medium of claim 11, wherein the first set of load parameters and the second set of load parameters comprise at least one of a user count, jitter, quantity of dropped packets, or latency.

13. The non-transitory computer-readable medium of claim 11, wherein each of the first BG and the second BG is a software-defined wide area network (SD-WAN) gateway communicatively coupling a branch LAN to another site of a SD-WAN.

14. The non-transitory computer-readable medium of claim 11, wherein the reconfiguration message alters the virtual router by changing a master BG for the virtual router from the first BG to the second BG.

15. The non-transitory computer-readable medium of claim 11, wherein the first BG and the second BG are members of a Virtual Router Redundancy Protocol (VRRP) group, and each respective VLAN of the set of VLANS is associated with a corresponding VRRP instance assigning a master BG to the respective VLAN.

16. The system of claim 1, wherein the reconfiguration message alters the first virtual router by changing a master BG for the virtual router from the first BG to the second BG.

17. The system of claim 4, wherein the instructions when executed on the processor cause the system to:
determine that a second network traffic load skew between the first BG and the second BG is less than a second threshold; and
in response to determining that the updated network traffic load of the first BG is less than the updated network traffic load of the second BG and determining that the second network traffic load skew between the first BG and the second BG is less than the second threshold, transmit the further reconfiguration message.

18. The system of claim 1, wherein the first network traffic load skew indicates a difference in traffic loads between the first BG and the second BG, and the instructions when executed on the processor cause the system to:
- monitor a first set of load parameters for the first BG, including a utilization factor for a deep packet inspection service of the first BG and a utilization factor for a content classification service of the first BG;
- monitor a second set of load parameters for the second BG, including a utilization factor for a deep packet inspection service of the second BG and a utilization factor for a content classification service of the second BG;
- calculate the network traffic load of the first BG based on the first set of load parameters, and calculate the network traffic load of the second BG based on the second set of load parameters; and
- determine that the network traffic load of the first BG is greater than a load threshold.

19. The method of claim 6, wherein the transmitting of the reconfiguration message to at least one of the first BG and the second BG comprises:
- transmitting the reconfiguration message to both the first BG and the second BG, or
- transmitting the reconfiguration message to a leader BG selected from among the first BG and the second BG.

20. The non-transitory computer-readable medium of claim 11, wherein the instructions when executed by the processing circuitry cause the system to:
- determine that an updated network traffic load skew between the first BG and the second BG is less than the second threshold; and
- in response to determining that the updated network traffic load skew between the first BG and the second BG is less than the second threshold, transmit, to at least one of the first BG and the second BG, a further reconfiguration message that re-assigns the first BG as the master BG for the first VLAN.

\* \* \* \* \*